US005486929A

United States Patent [19]
Heyl

[11] Patent Number: 5,486,929
[45] Date of Patent: Jan. 23, 1996

[54] TIME DIVISION MULTIPLEXED VIDEO RECORDING AND PLAYBACK SYSTEM

[75] Inventor: Lawrence F. Heyl, Mountain View, Calif.

[73] Assignee: Apple Computer, Inc., Cupertino, Calif.

[21] Appl. No.: 116,313

[22] Filed: Sep. 3, 1993

[51] Int. Cl.$^6$ .................................................. H04N 9/79
[52] U.S. Cl. .......................... 358/320; 358/310; 358/330; 358/334; 348/392; 348/393; 348/713
[58] Field of Search ..................................... 358/310, 320, 358/330, 334; 348/392, 393, 713, 488, 489, 493; H04N 9/79

[56] References Cited

U.S. PATENT DOCUMENTS

| | | | |
|---|---|---|---|
| 4,745,459 | 5/1988 | Ninomiya et al. | 348/431 |
| 4,910,605 | 3/1990 | Sasaki et al. | 358/310 |
| 5,136,391 | 8/1992 | Minami | 358/310 |
| 5,253,122 | 10/1993 | Chiba et al. | 358/330 |

OTHER PUBLICATIONS

"Report 624-4, Characteristics of Television Systems," Reports of the CCIR, 1990, pp. 1–33.
*Helical–scan Video Tape Cassette System Using 12.65 mm (0.5 in) Magnetic Tape on Type VHS.* IEC Standard 774, First Edition, 1983.
Y. Nagaoka, M. Tsurata, and H. Fujiwara, "High Performance VTR Based on the S–VHS Format," IEEE Trans. Consumer Electronics, 34(3), Aug. 1988, pp. 560–565.
*Helical–scan Video tape Cassette System Using 8 mm Magnetic Tape—Video 8,* IEC Standard 843, first edition, 1987.
K. Tsuneki, T. Ezki, and Y. Kubota, "Development of the High–Band 8 mm Video System", IEEE Trans. Consumer Electronics, 35(3), Aug. 1989, pp. 436–441.
*Digital Television,* C. P. Sandbank, Ed., J. Wiley & Sons, 1990, pp. 585–592.
S. Mehrgardt, in "Noise Spectra of Digital Sine–Generators Using The Table–Lookup Method," IEEE Trans. Acoustics, Speech and Signal Processing, vol. ASSP–31(4), Aug. 1983, pp. 1037–1039.

*Primary Examiner*—Tommy P. Chin
*Assistant Examiner*—Khoi Truong
*Attorney, Agent, or Firm*—Heller, Ehrman, White & McAuliffe; David J. Larwood

[57] ABSTRACT

A system and method for recording video signals onto analog magnetic tape, and for the playback of those recorded signals. Such a system includes a digital luminance signal generator, a first digital chrominance signal, and a second digital chrominance signal compatible with a predetermined composite television signal standard. The chrominance signals are sample rate reduced by a sample rate reduction circuit, and then all three signals are multiplexed to generate a digital time division multiplexed video signal. This signal is frequency modulated, and then converted to an analog signal for recording onto an analog magnetic tape. This process is reversed for the playback of prerecorded signals. The signals recorded by and recovered by the present invention should be free of most artifacts related to composite television signal recording, have increased dynamic range, and have noise immunity comparable to other FM recording methods. Performance should also be independent of the type of magnetic tape used.

38 Claims, 5 Drawing Sheets

TIME DIVISION MULTIPLEXED VIDEO RECORDING AND PLAYBACK SYSTEM

BACKGROUND OF THE INVENTION

The present invention relates generally to the recording of video signals, and more particularly to the recording of time division multiplexed video signals onto analog magnetic tape.

As is well known to those skilled in the art, NTSC and PAL composite television signals are recorded using frequency modulation of the luminance component, which is then used as the AC bias signal for downconverted QAM encoded chrominance components. QAM, or Quadrature Amplitude Modulation encoding, is the suppressed carrier amplitude modulation of two subcarriers in quadrature, such as I and Q for NTSC, or U and V for PAL. U and V chrominance signals are also used in SECAM composite television systems, which use an FM encoded chrominance technique. The signal parameters of these and other composite television standards can be found in "Report 624-4, Characteristics of Television Systems," Reports of the CCIR, 1990, pp. 1–33.

Common consumer VCR standards are VHS, S-VHS, Video-8, and Hi8. The parameters of VHS are defined in *Helical-scan Video Tape Cassette System Using 12.65 mm (0.5 in) Magnetic Tape on Type VHS.* IEC Standard 774, First Edition, 1983. The parameters of S-VHS (a proprietary system of JVC) are defined in a paper by Y. Nagaoka, M. Tsurata, and H. Fujiwara entitled "High Performance VTR Based on the S-VHS Format, "IEEE Trans Consumer Electronics, 34(3), Aug. 1988, pp. 560–565. The parameters of Video-8 are defined in *Helical-scan Video tape Cassette System using 8 mm Magnetic Tape— Video 8*, IEC Standard 843, first edition, 1987. The parameters of Hi8 (a proprietary system of Sony Corporation) are defined in a paper by K. Tsuneki, T. Ezaki, and Y. Kubota entitled "Development of the High-Band 8 mm Video System" IEEE Trans Consumer Electronics, 35(3), Aug. 1989, pp. 436–441.

All four VCR systems described above require a composite television signal input which is processed for recording by separating the baseband luminance and QAM encoded chrominance components. These signals are then further encoded for video recording. The baseband luminance signal is applied to an FM modulator, and the QAM encoded chrominance is down-converted to a lower subcarrier frequency. All of the video recording systems use a frequency division multiplex approach where encoded luminance and chrominance occupy separate well defined bands, with strict requirements as to modulated signal bandwidth.

Artifacts commonly associated with composite television signal encoding are cross-chroma and cross-luma (together generically called cross-color) and smear. Cross-color is caused by crosstalk between luminance and chrominance signals. This problem is often quite severe on synthetic imagery, such as graphics. Smear is caused by excessive delay between different channels, and is corrected through the use of matched analog filters and delay lines. In addition, the QAM encoding technique has an inherently poor dynamic range and signal to noise ratio, resulting in severe limitations on the quality of a recovered signal.

Accordingly, an object of the present invention is to record component video signals onto analog magnetic tape without first generating the associated composite television signals.

Another object of the present invention is to record component video signals onto analog magnetic tape with fewer processing stages to suppress noise and distortion.

Still another object of the present invention is to record component video signals onto analog magnetic tape using time division multiplexing and frequency modulation of the luminance and chrominance signals to increase dynamic range and to further suppress or eliminate noise and distortion of a recorded signal.

Yet another object of the present invention is to record component video signals onto analog magnetic tape avoiding cross-color artifacts associated with composite television signal encoding.

Still another object of the present invention is to use time division multiplex and sample rate conversion techniques to supplant the quadrature amplitude modulation chrominance recording technique.

Yet another object of the present invention is to recover and display time division multiplexed video signals from a prerecorded analog magnetic tape.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a system and method for recording video signals onto analog magnetic tape, and for the playback of those recorded signals. Such a system includes means for generating a digital luminance signal, a first digital chrominance signal, and a second digital chrominance signal compatible with a predetermined composite television signal standard. The chrominance signals are sample rate reduced by a sample rate reduction circuit, and then all three signals are multiplexed to generate a digital time division multiplexed video signal. This signal is frequency modulated, and then converted to an analog signal for recording onto an analog magnetic tape. This process is reversed for the playback of prerecorded signals.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
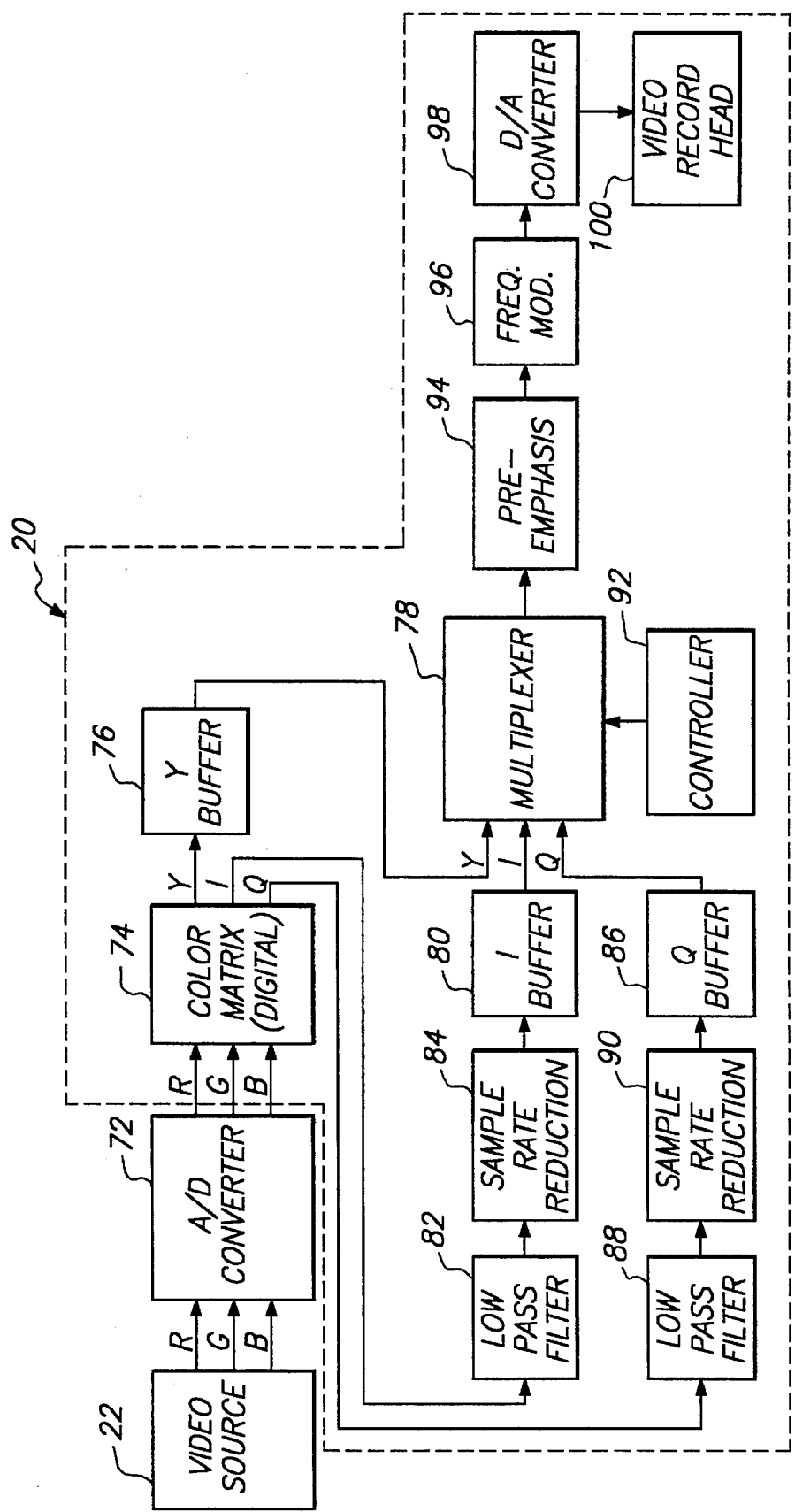
FIG. 1 shows a block diagram of a Time Division Multiplexed Video Recording System according to the present invention.
Figure 2:
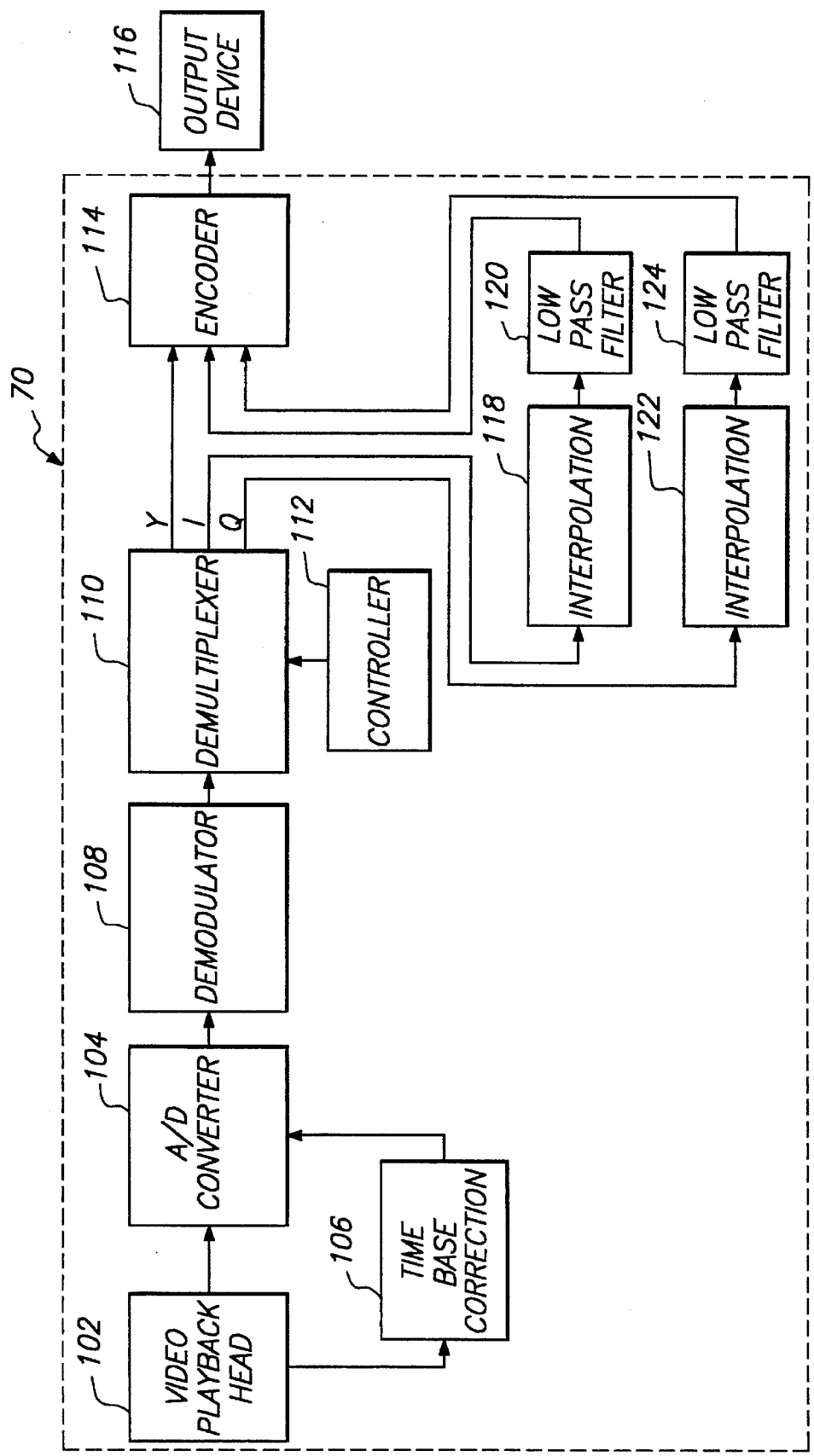
FIG. 2 shows a block diagram of a Time Division Multiplexed Video Playback System according to the present invention.

The present invention will be described in terms of the preferred embodiment. The present invention is a Time Division Multiplexed Video Recording System (VRS) and Video Playback System (VPS) for recording television signals onto analog magnetic tape, and for the playback of those recorded signals. Such systems are shown in FIGS. 1 and 2. The VRS (see FIG. 1) is referred to by general reference numeral 20, and the VPS (see FIG. 2) is referred to by general reference numeral 70.

For purposes of this discussion, the use of VRS 20 and VPS 70 with NTSC standard (YIQ) component television signals will be explained. However, it will be apparent to those skilled in the art that VRS 20 and VPS 70 can be easily modified for use with PAL and SECAM (YUV) component television signals. Or with further modifications, VRS 20 and VPS 70 can be modified for use with any other composite television standard. Also, common signal processing requirements well known in the art and disclosed in the various standards (e.g. synchronization pulses, color burst generation, signal delays, composite to component separation and demodulation, etc.) will not be discussed to avoid obscuring the present invention.

Figure 3:
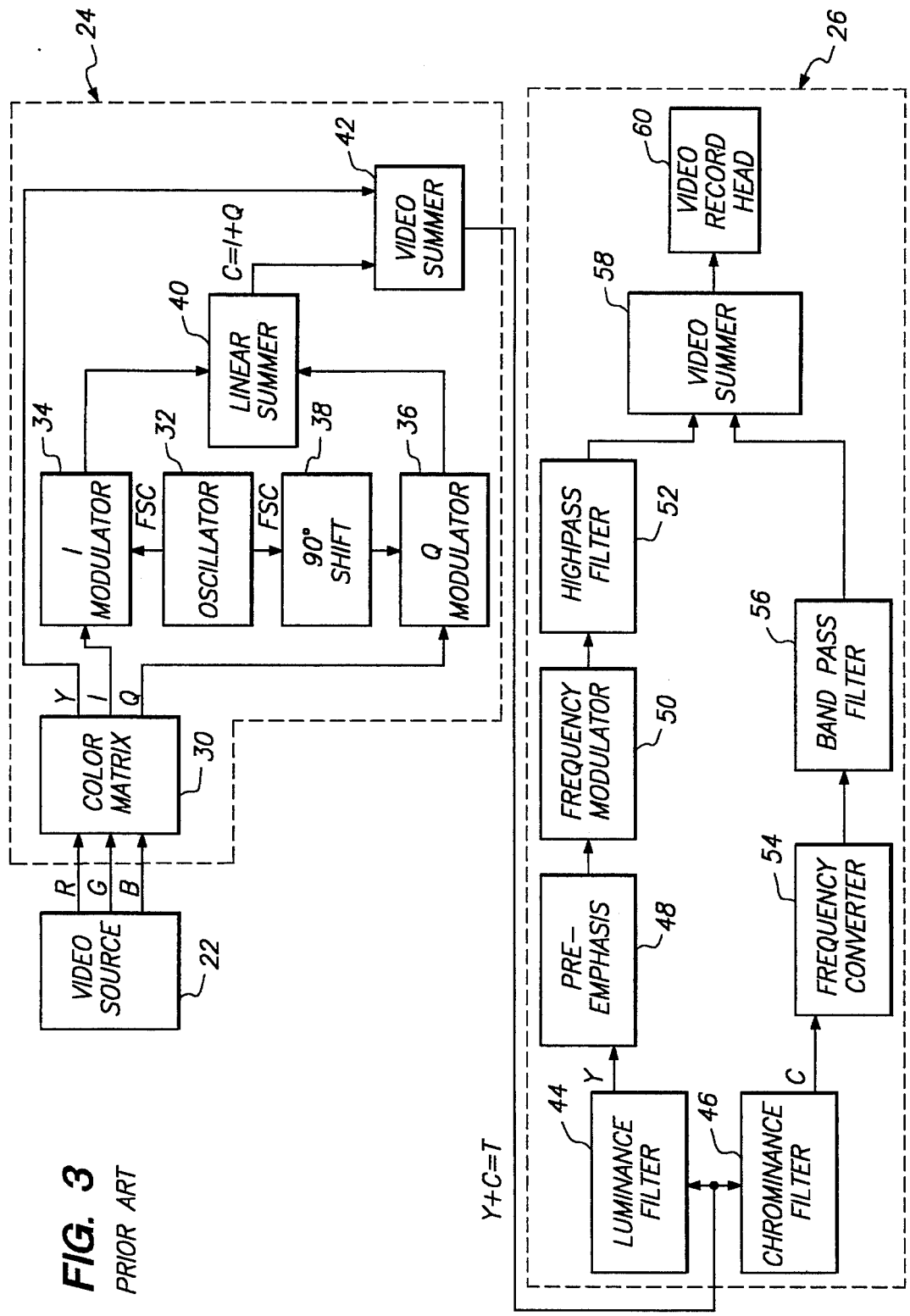
FIG. 3 shows a block diagram of a prior art system for recording composite television signals onto analog magnetic tape.

Referring now to FIG. 3, a prior art system for recording component signals onto magnetic tape is shown. The prior art system shown in FIG. 3 includes three main components: a video source 22 which provides RGB component data representative of the frame or frames in a video movie; a composite television encoder (contained within dotted line 24); and a VCR (contained within dotted line 26). Video source 22 may be a color television camera, a computer interface, or any other source of RGB data. If video source 22 produces digitized RGB data signals, a digital to analog (D/A) converter (not shown) is required to convert those digital signals to analog form.

Composite television encoder 24 includes an NTSC color transformation matrix 30 which receives the RGB data from video source 22. As is well known in the art, color transformation matrix 30 transforms analog RGB signals into YIQ color space signals, where Y, I, and Q are all functions of time and space, and:

$Y = 0.299R + 0.587G + 0.114B;$ $I = 0.27(B-Y) + 0.74(R-Y);$ and $Q = 0.41(B-Y) + 0.48(R-Y).$ Next, the I and Q signals are QAM encoded. These signals are used to modulate a subcarrier frequency $f_{sc}$, generated by an oscillator 32. I modulator 34 receives the reference signal $f_{sc}$ from oscillator 32, and the analog I signal from color transformation matrix 30. Q modulator 36 receives the reference signal $f_{sc}$ (phase shifted 90° behind that received by I modulator 34) from oscillator 32 and 90° phase shifter 38. Q modulator 36 also receives as an input the analog Q signal from color transformation matrix 30. The modulated I and Q signals are generated by I modulator 34 and Q modulator 36, then added together in linear summer 40. Linear summer 40 generates a chrominance signal C, which is the phasor sum of the modulated I and Q signals.

Signals Y and C are then added together in a video summer 42, which generates a total composite video signal T. It is this signal T that is then applied to VCR 26.

In VCR 26, luminance filter 44 is used to extract luminance signal Y from composite video signal T, and chrominance filter 46 is used to extract chrominance signal C from video signal T.

Next, luminance signal Y is modified for recording by a single-zero high pass pre-emphasis filter 48, then by frequency modulator 50, and finally by high pass filter 52, all of which are well known in the art.

Chrominance signal C is downconverted (typically to a frequency of about 700 kHz, referred to as $f_{sc}'$) by frequency converter 54, and then filtered by band pass filter 56, as is also well known in the art. The modulated and frequency converted Y and C signals are then added together in a video summer 58, which generates a frequency division multiplexed output that drives a video recording head 60.

Figure 4:
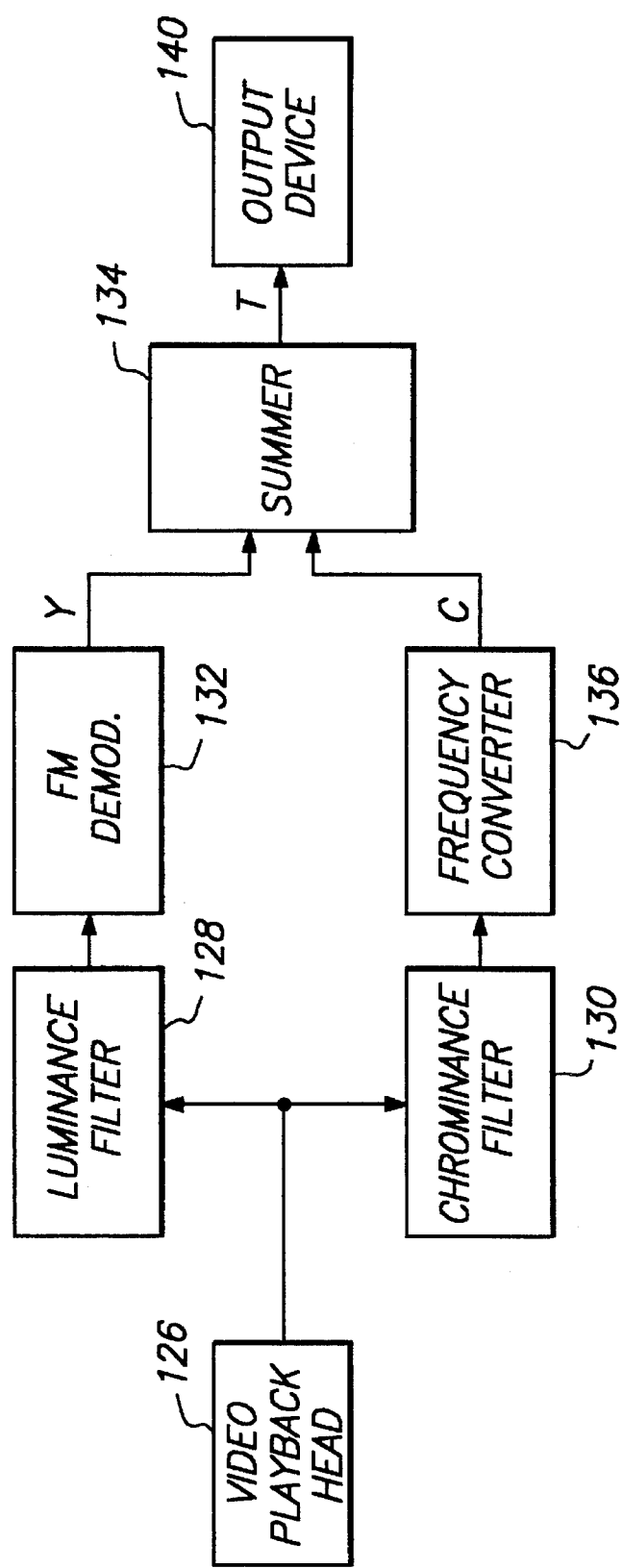
FIG. 4 shows a block diagram of a prior art system for the playback of recorded composite television signals from analog magnetic tape.

Referring now to FIG. 4, a prior art system for the playback of recorded video signals is shown. A video playback head 126 recovers a frequency division multiplexed video signal from a prerecorded magnetic tape (not shown). This frequency division multiplexed video signal is then applied as an input to luminance filter 128 and chrominance filter 130.

Luminance filter 128 generates as an output the FM encoded luminance signal Y. This FM encoded Y signal is applied as an input to frequency demodulator 132, which generates as an output the baseband Y signal. This baseband Y signal is then applied as an input to summer 134.

Chrominance filter 130 generates as an output the QAM encoded chrominance signal. This signal is applied as an input to frequency converter 136, which upconverts the QAM encoded chrominance signal to $f_{sc}$ from $f_{sc}'$. This upconverted QAM encoded chrominance signal is also applied as an input to summer 134, which generates a composite video signal T. Composite video signal T is capable of driving or being displayed on an output device 140, which may be a transmitter, a television, or any other output device. As was mentioned above, the encoding, decoding, and extensive use of analog signal processing in this prior art technique adds unavoidable cross-color, smear, noise, and distortion to the recorded signal. In addition, the inherently poor dynamic range of the QAM encoding technique limits the quality of a recovered signal.

Referring now to FIG. 1, a block diagram of VRS 20 according to the present invention is shown. VRS 20 supplants the signal processing method used in the prior art through time division multiplexing and sample rate conversion techniques. The time division multiplexed baseband component television signals generated by VRS 20 are then recorded using conventional FM magnetic recording techniques. This implementation directly leads to higher recording quality by virtue of improved dynamic range and a higher signal to noise ratio.

VRS 20 receives RGB component data signals from video source 22, which may be any source of component television signals. If the RGB data signals generated by video source 22 are in analog form, they must first be converted to digital form by an analog to digital (A/D) converter 72. These digitized RGB data signals are then converted into digital YIQ color space by digital color transformation matrix 74. Digital color transformation matrix 74 may be in the form of a look-up table to generate the single luminance and two chrominance signals. In an alternative embodiment, video source 22 may itself generate YIQ color space signals, eliminating the need for digital color transformation matrix 74. In such an alternative embodiment, video source 22 may be a circuit which separates and demodulates composite NTSC encoded television signals into its Y, I, and Q signal components, or video source 22 may be a computer interface.

In a preferred embodiment, the digitized RGB signals, as well as the digital YIQ signals generated by color transformation matrix 74, are all of equal bandwidth. That is, they are all sampled at the same rate. According to CCIR Standard 601, digitized R, G, and B signals are all to be sampled at a studio standard rate of 13.5 MHz. This 13.5 MHz sampling rate was chosen by the CCIR to provide compatibility between digital implementations of the PAL and NTSC television systems. The digital Y, I, and Q signals generated by digital color transformation matrix 74 (or video source 22, in an alternative embodiment) are also sampled at a rate of 13.5 MHz each. This sampling rate structure, where the Y, I, and Q signals are all sampled at the 13.5 MHz rate, is usually expressed as the ratio 4:4:4. In an alternative embodiment, the digital Y, I, and Q signals need not be sampled at the same rate, and sampling rates greater than 13.5 MHz may be used.

All digital implementations of broadcast television systems perform baseband chrominance bandwidth reduction to take advantage of the eye's reduced chrominance spatial bandwidth capability. CCIR Standard 601 defines a basic studio standard YIQ signal with co-sited samples in the ratio 4:2:2. That is, the Y signal is sampled at 13.5 MHz, the I signal is sampled at 6.75 MHz, and the Q signal is also sampled at 6.75 MHz. The present invention is adaptable to sampling rate structures of 4:2:2, 4:1:1, or lower. Also, the I and Q signals need not be sampled at the same rate. The actual sampling rate and sampling rate structure chosen is mostly a function of cost, convention, and the nature of the chrominance signals themselves. No specific sampling rate structure is required for VRS 20 to work for its intended purpose. According to the Nyquist sampling theorem, the minimum sampling frequency that can be used, without introducing unwanted alias components into the decoded analog signal, is equal to twice the highest frequency of the original analog signal. In practice, sample rate reduction by factors of two are easiest to implement and are notably free of sampling related artifacts.

Next, the process by which the YIQ sampling rate structure is modified from its original 4:4:4 ratio will be discussed. With respect to the digital Y signal generated by digital color transformation matrix 74, its bandwidth remains unchanged at 13.5 MHz during all signal processing steps. The digital Y signal is temporarily stored in Y buffer 76, which may store a frame, a field, or a line of Y signal data. The Y signal data stored in Y buffer 76 is used as an input by multiplexer 78.

In the NTSC standard, a frame is nominally made up of two interlaced fields of 262.5 lines each. Since each frame nominally contains 41 lines used for vertical blanking, each field contains 242 lines of image data. Also, each line has a nominal duration of approximately 63.555 µs, 10.7 µs of which is used for horizontal blanking. Thus, each line has approximately 52.86 µs of image data. As was mentioned above, the use of blanking signals will not be discussed to avoid obscuring the present invention.

The 13.5 MHz bandwidth I signal generated by digital color transformation matrix 74 is sample rate reduced, preferably to a bandwidth of 6.75 or 3.375 MHz. There are several methods of sample rate reduction, most often used in the telecommunications industry, known to those skilled in the art. All such methods require low pass filtering before the signal is sample rate reduced. VRS 20 uses digital low pass filter 82 to filter the I data signal. In a preferred embodiment, digital low pass filter 82 has two dimensional isotropic response for smear reduction.

Next, the filtered I signal is sample rate reduced by sample rate reduction circuit 84. Preferably, sample rate reduction circuit 84 performs a two dimensional sample rate reduction to approximate an isotropic response. In an alternative embodiment of the present invention, the functions of low pass filter 82 and sample rate reduction circuit 84 may be combined in a single low pass filter and sample rate reduction circuit (not shown). Examples of sample rate reduction techniques can be found in *Digital Television*, C. P. Sandbank, Ed., J. Wiley & Sons, 1990, pp. 585–592.

The filtered and sample rate reduced I signal generated by sample rate reduction circuit 84 is then temporarily stored in I buffer 80, which may also store a frame, a field, or a line of I signal data. I signal data stored in I buffer 80 is used as an input by multiplexer 78.

The digital Q signal generated by digital color transformation matrix 74 is processed in the same manner as the digital I signal. First, the 13.5 MHz bandwidth Q signal is sample rate reduced, preferably to a bandwidth of 6.75 or 3.375 MHz. The I and Q signals need not be sample rate reduced by the same amount. A digital low pass filter 88 is used to filter the Q signal. In a preferred embodiment, digital low pass filter 88 has two dimensional isotropic response for smear reduction.

The filtered Q signal is then sample rate reduced by sample rate reduction circuit 90. Preferably, sample rate reduction circuit 90 performs a two dimensional sample rate reduction to approximate an isotropic response. In an alternative embodiment of VRS 20, the functions of low pass filter 88 and sample rate reduction circuit 90 may be combined in a single low pass filter and sample rate reduction circuit (not shown).

The filtered and sample rate reduced Q signal generated by sample rate reduction circuit 90 is then temporarily stored in Q buffer 86, which may also store a frame, a field, or a line of Q signal data. Q signal data stored in Q buffer 86 is used as an input by multiplexer 78. In an alternative embodiment, video source 22 may generate digital YIQ signals having the proper sampling rate structure used for recording (e.g. 4:1:1). In this case, low pass filters 82 and 88, as well as sample rate reduction circuits 84 and 90, would not be needed.

Next, the baseband luminance signal and the sample rate reduced baseband chrominance signals are multiplexed so they may be recorded. Multiplexer 78 is controlled by a controller 92, which may be in the form of a finite state machine. Controller 92 controls which input (i.e., data from Y buffer 76, I buffer 80, or Q buffer 86) to multiplexer 78 will be selected and thus generated at the output of multiplexer 78. If Y buffer 76, I buffer 80, and Q buffer 86 can store an entire field of image data, the following multiplexing scheme is used: for the first half (121 lines) of a field to be recorded, the Y signal data is selected by multiplexer 78 for the first portion of a line to be recorded, and the I signal data is selected by multiplexer 78 for the remaining portion of a line to be recorded; and for the second half (121 lines) of a field to be recorded, the Y signal is selected by multiplexer 78 for the first portion of a line to be recorded, and the Q signal is selected by multiplexer 78 for the remaining portion of a line to be recorded.

Figure 5:
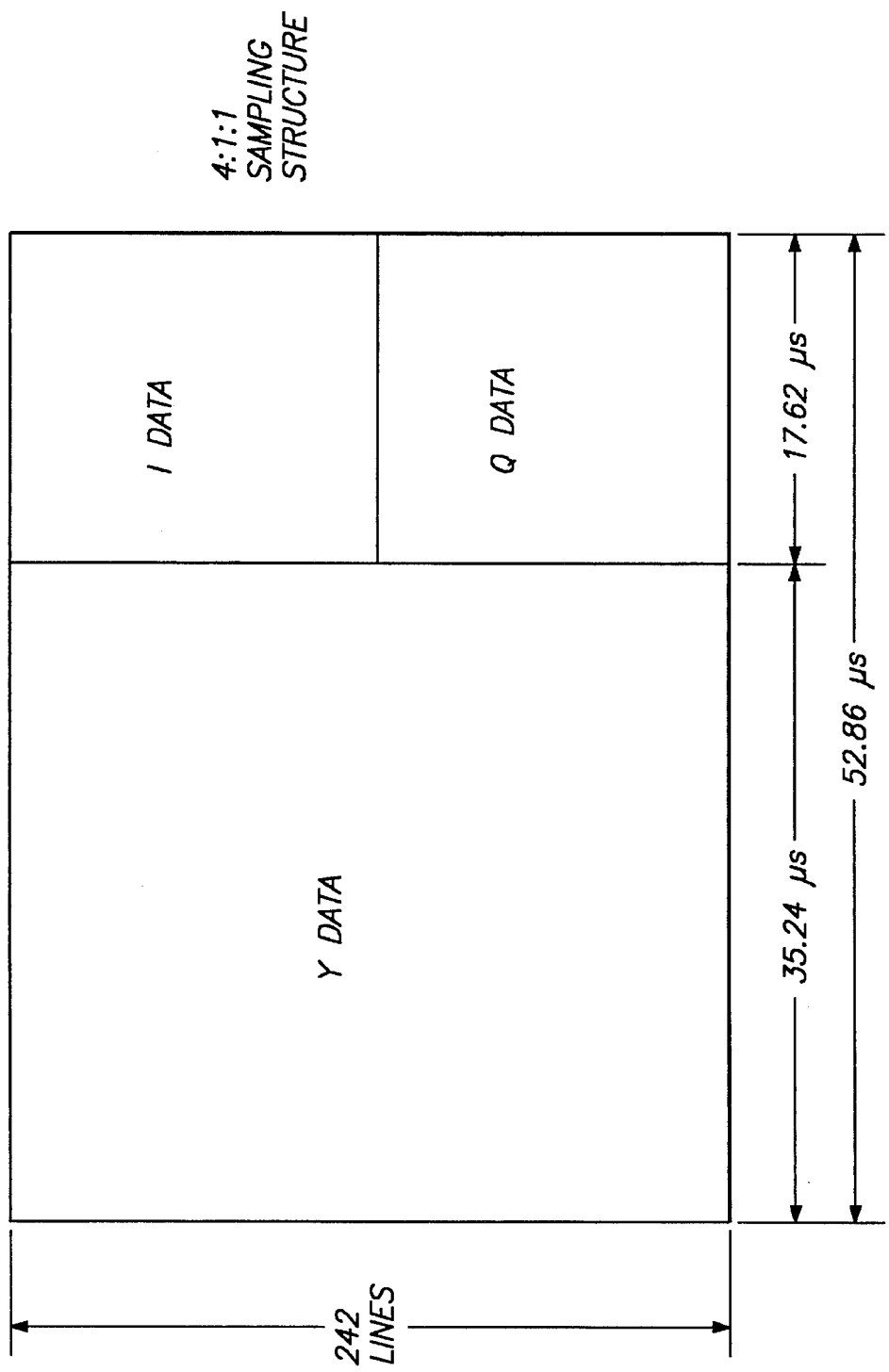
FIG. 5 shows a schematic representation of a field containing time division multiplexed signal data recorded according to the present invention.

The fraction of a line to be recorded containing Y data, and the fraction of a line to be recorded containing I and Q data, as well as the rate at which data is removed from the buffers, depends on the extent to which the I and Q signals have been sample rate reduced. For example, when a 4:1:1 sampling rate structure is used, a recorded NTSC field could be represented schematically as shown in FIG. 5. In a 4:1:1 sampling structure, the Y signal contains ⅔ of all data to be recorded in a field, and the I and Q signals each contain ⅙ of all data to be recorded in a field.

In an NTSC implementation, Y data would be recorded during approximately the first 35.24 µs of each line for all 242 lines in a field. I data would be recorded during approximately the last 17.62 µs of each line for the first 121 lines in a field, and a Q data would be recorded on approximately the last 17.62 µs of each line for the last 121 lines in a field. As a practical matter, there should be some separation between the Y and I or Q data recorded on the same line, to allow the device which reproduces the signal to switch between the reading of Y and I or Q data. The degree of separation needed between the recorded Y signal and the recorded I or Q signals depends on the capabilities of the reproduction device. Finally, FIG. 5 shows that there is a degree of time compression performed on the multiplexed signal that is directly proportional to the sampling rate structure chosen.

If Y buffer 76, I buffer 80, and Q buffer 86 can only store one line of image data, the following multiplexing scheme is used: for the first line to be recorded, the Y signal is selected by multiplexer 78 for the first portion of the line, and the I signal is selected by multiplexer 78 for the remaining portion of the line to be recorded; and for the second line to be recorded, the Y signal is selected by multiplexer 78 for the first portion of the line, and the Q signal is selected by multiplexer 78 for the remaining portion of the line. This process is repeated for each line in a field to be recorded.

If all three component signals Y, I, and Q need to be recorded on each line, the signals can be time division multiplexed to fit on one line, but with a decrease in quality by virtue of the further needed reductions in sample rate.

The multiplexed video signal having been generated, it may now be recorded using conventional FM recording techniques. First, a digital pre-emphasis filter 94 receives as an input the time division multiplexed signal generated at the output of multiplexer 78, and generates as an output a filtered time division multiplexed signal. Pre-emphasis filter 94, used to compensate for losses which occur during later signal processing steps, is preferably a single zero high pass filter.

The filtered time division multiplexed signal generated by pre-emphasis filter 94 is next used as an input by digital frequency modulator 96, which is used to generate a digital FM encoded time division multiplexed signal.

To generate the digital FM encoded time division multiplexed signal, the input signal is multiplied by a constant scale factor to set the FM deviation. A constant is then added to set the FM output frequency for a "zero" input level, corresponding to the negative tip of sync. The phase is integrated using an accumulator (not shown). For a constant phase input, the output sequence will have a period of the accumulator clock rate multiplied by the ratio of the phase to the accumulator word width. The output is a ramp which is not band limited. This ramp is used to address a look-up table (not shown) containing one cycle of a sine wave in order to generate a band limited output sequence. This method was discussed by S. Mehrgardt, in "Noise Spectra of Digital Sine-Generators Using the Table-Lookup Method," IEEE Trans. Acoustics, Speech and Signal Processing, Vol. ASSP-31(4), August 983, pages 1037–1039.

The digital FM encoded time division multiplexed signal generated by frequency modulator 96 is next used as in input by D/A converter 98. D/A converter 98 converts the digital input signal to an analog FM encoded time division multiplexed output signal, which is applied to a video record head 100 to cause recording onto an analog magnetic tape (not shown).

Referring now to FIG. 2, a block diagram of VPS 70 according to the present invention is shown. A video playback head 102 recovers the analog FM encoded time division multiplexed signal from a pre-recorded analog magnetic tape (not shown). This recovered signal is then applied as an input to analog to digital (A/D) converter 104. A/D converter 104 also receives as an input a control signal generated by a time base correction circuit 106. Time base correction circuit 106 monitors the recovered signal generated by video playback head 102 and generates the control signal sent to A/D converter 104. This control signal allows A/D converter 104 to correct for time-base distortions present in the recovered signal. In a preferred embodiment, time base correction circuit 106 may be implemented line by line through sampling of the FM signal frequency during blanking and applying a corrective signal to A/D converter 104. This technique is similar to the method known by those skilled in the art by which conventional NTSC or PAL time base correction circuits use the recorded color burst to estimate and correct time base distortion.

A/D converter 104 then generates a digital FM encoded time division multiplexed signal which is applied as an input to frequency demodulator 108. Frequency demodulator 108 generates a digital time division multiplexed signal which is applied as an input to demultiplexer 110. Demultiplexer 110 is controlled by a controller 112, which may be in the form of a finite state machine. A signal generated by controller 112 controls at which output (Y, I, or Q) the input signal to demultiplexer 110 will be generated. Demultiplexer 110 then demultiplexes the digital time division multiplexed signals back into the individual Y, I, and Q baseband component signals. Demultiplexer 110 may also perform time expansion to compensate for any time compression performed before the component signals were recorded.

The baseband Y signal generated by demultiplexer 110 is applied as an input to encoder 114. In the preferred embodiment, encoder 114 is an NTSC encoder which generates composite NTSC signals capable of being used or displayed by output device 116. Output device 116 may be a transmitter, a television, or any other output device.

The baseband frequency rate reduced I signal generated by demultiplexer 110 is interpolated (i.e., sample rate increased) by interpolation circuit 118. Interpolation circuit 118 may be implemented in many ways, as is well known in the art. Next, the interpolated I signal generated by interpolation circuit 118 is applied as an input to digital low pass filter 120. The interpolated and low pass filtered I signal is then applied as an input to encoder 114.

The baseband frequency rate reduced Q signal generated by demultiplexer 110 is processed in the same fashion as the sample rate reduced I signal. That is, the sample rate reduced Q signal is first interpolated by interpolation circuit 122, then low pass filtered by digital low pass filter 124, then applied as an input to encoder 114.

In summary, VRS 20 and VPS 70 allow for the recording and playback of FM encoded time division multiplexed video component signals. The signals recorded by VRS 20 and recovered by VPS 70 should be free of most artifacts related to composite television signal recording, have increased dynamic range, and have noise immunity comparable to other FM recording methods. Performance should also be independent of the type of magnetic tape used.

The present invention has been described in terms of a preferred embodiment. The invention, however, is not limited to the embodiment depicted and described. Rather, the scope of the invention is defined by the appended claims.

What is claimed is:

1. A system for recording component television signals onto an analog video tape, comprising:

means for generating a digital luminance signal, a first digital chrominance signal, and a second digital chrominance signal, said digital luminance signal, said first digital chrominance signal, and said second digital chrominance signal compatible with a predetermined composite television signal standard and having a first sampling rate;

first sample rate reduction means, coupled to said first digital chrominance signal for generating therefrom a first sample rate reduced digital chrominance signal having a second sampling rate;

second sample rate reduction means coupled to said second digital chrominance signal for generating therefrom a second sample rate reduced digital chrominance signal having a third sampling rate;

multiplexer means, coupled to said digital luminance signal, said first sample rate reduced digital chrominance signal, and said second sample rate reduced digital chrominance signal, for generating therefrom a digital time division multiplexed video signal;

digital signal processing means, coupled to said digital time division multiplexed video signal, for generating therefrom a digital frequency modulated time division multiplexed video signal; and digital to analog converter means for converting said digital frequency modulated time division multiplexed video signal into an analog frequency modulated time division multiplexed video signal capable of being recorded onto said analog video tape;

said system having a bandwidth capacity no greater than necessary for common consumer VCR standards.

2. The system of claim 1 wherein said digital signal processing means includes:

digital pre-emphasis filter means, coupled to said digital time division multiplexed signal, for generating a digital high-pass filtered time division multiplexed signal; and digital frequency modulator means, coupled to said digital high pass filtered time division multiplexed signal, for generating said digital frequency modulated time division multiplexed video signal.

3. The system of claim 1 wherein said means for generating a digital luminance signal, a first digital chrominance signal, and a second digital chrominance signal includes a digital color transformation matrix.

4. The system of claim 1 wherein said sample rate reduction means performs a two dimensional sample rate reduction.

5. The system of claim 1 further including controller means for controlling the operation of said multiplexer means.

6. The system of claim 5 wherein said controller means is a finite state machine.

7. The system of claim 1 wherein said predetermined composite television standard is NTSC.

8. The system of claim 1 wherein said predetermined composite television standard is PAL.

9. The system of claim 1 wherein said predetermined composite television standard is SECAM.

10. The system of claim 1 wherein said component television signals are Y, I, and Q.

11. The system of claim 1 wherein said component television signals are Y, U, and V.

12. The system of claim 1 wherein said component television signals are red, green, and blue.

13. The system of claim 2 wherein said pre-emphasis means is a single zero high pass filter.

14. The system of claim 1 wherein said first sampling rate is 13.5 Mhz.

15. The system of claim 1 wherein said second sampling rate and said third sampling rate are 6.75 MHz.

16. The system of claim 1 wherein said second sampling rate and said third sampling rate are 3.375 MHz.

17. The system of claim 1 wherein said first sampling rate is four times as great as said second sampling rate and said third sampling rate.

18. The system of claim 1 wherein said second sampling rate is different from said third sampling rate.

19. The system of claim 1 wherein said digital time division multiplexed video signal is also time compressed.

20. The system of claim 1 further including means for buffering said digital luminance signal, said first sample rate reduced digital chrominance signal, and said second sample rate reduced digital chrominance signal.

21. The system of claim 1 wherein said first sampling rate is two times as great as said second sampling rate and said third sampling rate.

22. The system of claim 1 wherein said first sampling rate is 15.1875 MHz, said second sampling rate is 7.59375 MHz, and said and third sampling rate is 7.59375 MHz.

23. A system for the playback of video signals from a prerecorded analog video tape, comprising:

means for generating an analog FM encoded time division multiplexed video signal from said prerecorded analog video tape;

analog to digital converter means, coupled to said analog FM encoded time division multiplexed video signal, for generating therefrom a digital FM encoded time division multiplexed video signal;

demodulator means, coupled to said digital FM encoded time division multiplexed video signal, for demodulating said digital FM encoded time division multiplexed video signal and for generating therefrom a digital time division multiplexed video signal;

demultiplexer means, coupled to said digital time division multiplexed video signal, for demultiplexing said digital time division multiplexed video signal and for generating therefrom a digital luminance signal, a first sample rate reduced digital chrominance signal, and a second sample rate reduced digital chrominance signal, said digital luminance signal having a first sampling rate, said first sample rate reduced digital chrominance signal having a second sampling rate, and said second sample rate reduced digital chrominance signal having a third sampling rate;

first interpolator means, coupled to said first sample rate reduced digital chrominance signal for generating therefrom a first digital chrominance signal having said first sampling rate;

second interpolator means, coupled to said second sample rate reduced digital chrominance signal for generating therefrom a second digital chrominance signal having said first sampling rate; and encoder means, coupled to said luminance signal, said first digital chrominance signal, and said second digital chrominance signal, for generating therefrom a composite television signal compatible output signal;

said system having a bandwidth capacity no greater than necessary for common consumer VCR standards.

24. The system of claim 23 further including time base correction means, coupled to said analog FM encoded time division multiplexed video signal, for generating a control signal coupled to said analog to digital converter, said control signal causing said analog to digital converter to correct any time base distortions present in said analog FM encoded time division multiplexed video signal.

25. The system of claim 23 further including controller means for controlling the operation of said demultiplexer means.

26. The system of claim 23 wherein said controller means is a finite state machine.

27. The system of claim 23 wherein said first sampling rate is 13.5 Mhz.

28. The system of claim 23 wherein said second sampling rate and said third sampling rate are 6.75 MHz.

29. The system of claim 23 wherein said second sampling rate and said third sampling rate are 3.375 MHz.

30. The system of claim 23 wherein said first sampling rate is four times as great as said second sampling rate and said third sampling rate.

31. The system of claim 23 wherein said second sampling rate is different from said third sampling rate.

32. The system of claim 23 wherein said demultiplexer means performs time base expansion on said digital time division multiplexed video signals.

33. The system of claim 23 wherein said means for generating an analog FM encoded time division multiplexed video signal is a video playback head.

34. The system of claim 23 wherein said first sampling rate is two times as great as said second sampling rate and said third sampling rate.

35. The system of claim 23 wherein said first sampling rate is 15.1875 MHz, said second sampling rate is 7.59375 MHz, and said third sampling rate is 7.59375 MHz.

36. A method for recording component television signals onto analog magnetic tape comprising the steps of:

generating a digital luminance signal, a first digital chrominance signal, and a second digital chrominance signal, said digital luminance signal, said first digital chrominance signal, and said second digital chrominance signal compatible with a predetermined composite television signal standard and having a first sampling rate;

generating first sample rate reduced digital chrominance signal from said first digital chrominance signal, said first sample rate reduced digital chrominance signal having a second sampling rate;

generating second sample rate reduced digital chrominance signal from said second digital chrominance signal, said second sample rate reduced digital chrominance signal having a third sampling rate;

generating a digital time division multiplexed video signal from said digital luminance signal, said first sample rate reduced digital chrominance signal, and said second sample rate reduced digital chrominance signal;

generating a digital frequency modulated time division multiplexed recording signal from said digital time division multiplexed video signal;

converting said digital frequency modulated time division multiplexed recording signal into an analog recording signal capable of being recorded onto an analog magnetic tape.

37. A method for the playback of video signals from a prerecorded analog magnetic tape comprising the steps of:

generating an analog FM encoded time division multiplexed video signal from said prerecorded analog magnetic tape;

converting said analog FM encoded time division multiplexed video signal into a digital FM encoded time division multiplexed video signal;

demodulating said digital FM encoded time division multiplexed video signal and generating therefrom a digital time division multiplexed video signal;

demultiplexing said digital time division multiplexed video signal and generating therefrom a digital luminance signal, a first sample rate reduced digital chrominance signal, and a second sample rate reduced digital chrominance signal, said digital luminance signal having a first sampling rate, said first sample rate reduced digital chrominance signal having a second sampling rate, and said second sample rate reduced digital chrominance signal having a third sampling rate;

interpolating said first sample rate reduced digital chrominance signal and said second sample rate reduced digital chrominance signal to generate therefrom a first digital chrominance signal having said first sampling rate, and a second digital chrominance signal having said first sampling rate; and encoding said luminance signal, said first digital chrominance signal, and said second digital chrominance signal, to generate therefrom a composite television signal compatible output signal.

38. The method of claim 37 further comprising the step of correcting any time base distortions present in said analog frequency encoded time division multiplexed video signal.

\* \* \* \* \*